June 5, 1923.
E. S. MERRIAM
RECOVERY OF GASOLINE FROM NATURAL GAS, ETC
Filed Oct. 16, 1920
1,457,786
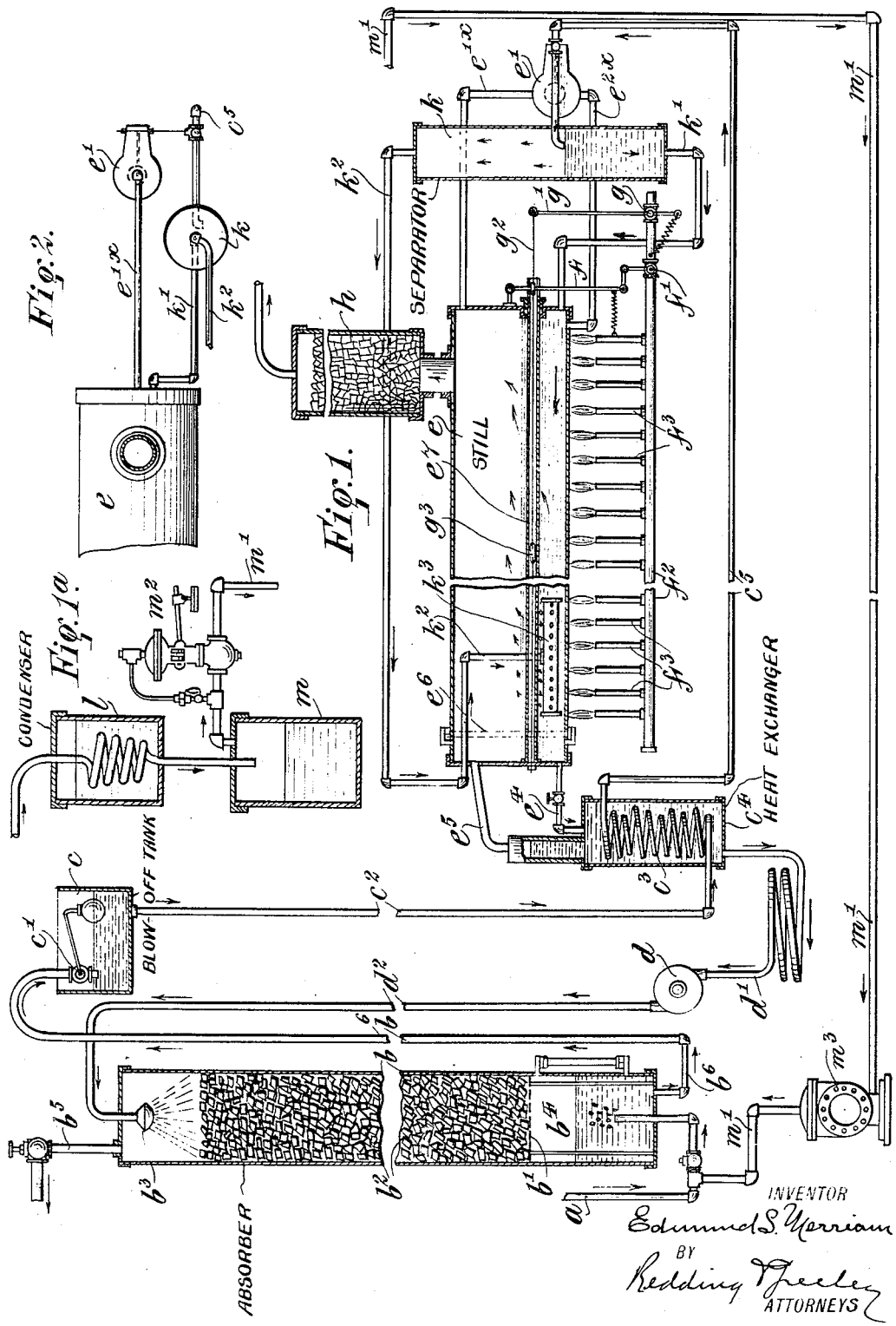

Patented June 5, 1923.

1,457,786

UNITED STATES PATENT OFFICE.

EDMUND S. MERRIAM, OF MARIETTA, OHIO.

RECOVERY OF GASOLINE FROM NATURAL GAS, ETC.

Application filed October 16, 1920. Serial No. 417,391.

*To all whom it may concern:*

Be it known that I, EDMUND S. MERRIAM, a citizen of the United States, residing in Marietta, in the State of Ohio, have invented certain new and useful Improvements in Recovery of Gasoline from Natural Gas, Etc., of which the following is a specification, reference being had to the accompanying drawings forming a part hereof.

In Letters Patent of the United States No. 1,304,587, dated May 27, 1919, there are illustrated and described a method of and an apparatus for the recovery of condensible vapors, such as gasoline, from the gaseous body, such as air, casing head gas, or dry, natural gas, or artificial gas, of which such condensible vapors are constituents. The condensible vapors are first absorbed from the gaseous body by an absorbent menstruum, such as oil, and, in accordance with the invention, the volatile constituents or condensible vapors are then separated from the menstruum, which is returned to the absorption apparatus for use again, while the condensible vapors are rectified and condensed, the separation of the condensible vapors from the menstruum being effected by the progressive heating of the menstruum, so that the more volatile constituents are driven off first and the less volatile constituents are driven off as the movement of the menstruum through the still continues, the more volatile and the less volatile vapors passing off together to the rectifier and the condenser. It has been found, in the practical use of the method and apparatus described in said Letters Patent, first, that the heated menstruum sometimes retains and carries back with it into the absorber, some of the condensible vapors which it is the purpose of the present invention to eliminate more completely from the menstruum in the still, and, second, that the uncondensed vapors, usually consisting largely of butane and, in some cases, of propane, which eventually leave the condenser, carry off with them some of the condensible vapors which would be lost if such uncondensed vapors were allowed to escape, it being a further purpose of this invention to recover such condensible vapors which are thus carried off. Accordingly, some of the less readily condensible vapors are permitted to separate from the menstruum at some convenient point, preferably after it has passed through the preheater but before its temperature has been raised in the still, and such separated vapors are permitted to pass through the menstruum again at a point at which its temperature is higher than at the point where the separation took place, it being found that such vapors in their passage through the menstruum facilitate and promote the separation from the menstruum of gasoline or other condensible vapors which otherwise would be retained to some extent in the menstruum and carried back to the absorber. Furthermore, in accordance with the invention, the uncondensed vapors which ultimately leave the condenser are themselves returned to the absorber so that the gasoline and other condensible vapors, which, as stated, are carried off with the uncondensed and less readily condensible vapors, shall be absorbed by the menstruum and recovered in large measure in subsequent distillation of the menstruum. In this manner not only is the recovery of gasoline from the non-condensible vapors increased, but the separation of the gasoline from the menstruum is facilitated. The invention will be more fully explained hereinafter with reference to the accompanying drawing in which it is illustrated as practised and embodied in an apparatus of the same character as that shown in said Letters Patent and in which—

Figure 1 illustrates, partly in section and partly in a somewhat conventional way, an apparatus in which the invention may be practised, Figure 1ᵃ representing a portion of such apparatus broken off from Figure 1 to save space.

Figure 2 is a detail top view of a portion of the apparatus shown in Figure 1.

In order that the explanation of the present invention may be clear and complete, the entire apparatus, in which and in connection with which the invention is practised, will be described although briefly.

The gas or gaseous body, whatever its specific character, which carries the gasoline or other constituents to be recovered is delivered from its main source of supply, through a pipe $a$ to an absorber $b$ which, in the form illustrated, is a tower or vertical tank with a perforated diaphragm or floor $b'$ to support a body $b^2$ of coke or other suitable material. The oil or menstruum to be charged is delivered at the upper end of the absorber through a suitable rose $b^3$ and trickles down through the body of coke in a counter-current against the gas which bubbles through the oil in the chamber $b^4$ at the bottom of the absorber and rises through the body of coke. The gas which is not absorbed by the oil passes off through a pipe $b^5$ to a place of use or storage. The charged oil or menstruum, which accumulates to a greater or less extent in the chamber $b^4$, is delivered therefrom continuously through a pipe $b^6$.

Preferably the charged oil is delivered to a blow-off tank $c$, under the control of a float valve $c'$, which may be placed at any convenient point with respect to the absorber, but preferably somewhat above the chamber $b^4$. The charged oil is delivered to the blow-off tank by the pressure of the gas within the tank $b$ upon the surface of the oil in the chamber $b^4$, and only so much gas pressure is required as may be necessary to carry the gas through the absorber and to deliver the charged oil to the blow-off tank. The purpose of the blow-off tank is to permit the less condensible gases to separate from the oil and they may be allowed to escape into the atmosphere at this point or, if deemed advisable, they might be collected and used in the same manner as the vapors which are permitted to separate at a later point in the circulation of the oil, as hereinafter described.

The oil or menstruum from which the desirable constituents are removed by the distillation process, to be described, may be returned from the still to the absorber by a suitable pump $d$ with pipe connections $d'$ and $d^2$ from the still to the rose $b^3$.

The charged oil from the blow-off tank $c$ is, in the present case, preferably delivered by a pipe $c^2$ to a coiled pipe $c^3$ in a preheater or heat exchanger $c^4$, in which the hot oil from the still gives up its heat to the cool, charged oil. The preheating of the charged oil in this manner is found to facilitate the separation of the less condensible gases which are utilized as hereinafter described, and for this reason it is preferred that such less condensible vapors be separated at a point in the circulation of the oil later than the blow-off tank $c$ and the preheater.

From the preheater or heat exchanger the charged oil, under a suitable pressure or head which may be created by suitable elevation of the blow-off tank $c$, passes by a pipe $c^5$ to the still $e$, the volume of oil within the still being controlled by a regulator $e'$ of usual or suitable character, as described in said Letters Patent. For the purpose of equalizing the pressure in the regulator and in the still the regulator is connected to the still, above and below the level of the liquid therein, as by pipes $e^{1x}$ and $e^{2x}$.

In the apparatus shown in said Letters Patent the oil or menstruum passed directly from the regulator $e'$ into the still $e$, but in the present case it passes into a separator $k$ in which the less readily condensible vapors, the separation of which has been facilitated by the heating of the charged oil in the preheater $c^4$, are permitted to separate from the charged oil, while the latter is preferably at a temperature substantially below that which it eventually attains in the still. The charged oil, from which the less readily condensible vapors have thus separated, is delivered to the still $e$ by a suitable pipe connection as at $k'$, and flows through the still continuously and freely in a relatively shallow and narrow stream of such length that the oil at the outlet end can be heated to a materially higher temperature than at the inlet end. The separated vapors are conducted from the top of the separator $k$, through a pipe $k^2$, to a perforated nozzle $k^3$ which is submerged in the oil in the still where the oil has substantially attained its maximum temperature, and are there permitted to bubble up through the oil. These vapors, where they enter the separator $k$, are not far from the equilibrium with the oil, but where they re-enter the oil, through the nozzle $k^3$, they are much further removed from equilibrium because the oil is then at a much higher temperature. Therefore the vapors are not likely to be re-absorbed by the oil. It is found, however, that the passage of these vapors through the highly heated oil facilitates the separation of the gasoline or other condensible vapors which are still retained in the oil at that point and, if not separated, would go back with the oil to the absorber.

The still $e$ consists of a long, closed vessel, which receives the oil through the pipe $k'$, as just described, and discharges it through a discharge pipe $e^4$ into the preheater $c^4$ and for the purpose of equalizing the pressures the top of the preheater may be connected with the upper part of the still as through a pipe $e^5$. The still may be provided with the usual gauge glass $e^6$ and is also provided, preferably, as described in said Letters Patent, with a thermostatic rod or tube $e^7$ by means of which and the arm $f$ of a valve $f'$ the temperature within the still may control the supply of fuel gas, by which the still is heated externally, through a pipe $f^2$. The latter is provided with a longitudinal series of burners $f^3$ so that the charged oil, which flows continuously through the still $e$, shall be heated progressively, receiving its first heating as it enters the still and being discharged from the still at its highest temperature. In addition to the fuel regulating valve $f'$ there may also be provided an emergency cut-off for the fuel which, as shown, may comprise a spring operated valve $g$, the arm $g'$ of which is held normally against movement by a wire $g^2$, extended through the tube $e^7$ and having a fusible link $g^3$, so that if the temperature in the still rises above a predetermined degree the wire will part and the valve be closed by its spring.

The first part of the present invention has to do with the promotion of the separation of gasoline or other condensible vapors from the heated menstruum in the still by the passage through such menstruum of the less readily condensible vapors previously separated, as in the separator $k$. The second part of the invention has to do with the recovery of the gasoline or other condensible vapors from the mixture thereof with the lighter and less readily condensible vapors such as the butane and the propane, which passes off from the condenser, in which the condensation of the greater part of the condensible vapors is effected. From the rectifier $h$ the vapors distilled off from the menstruum in the still $e$ pass through a condenser $l$, conventionally indicated in Figure $1^a$, to a receptacle $m$, also conventionally indicated in Figure $1^a$, in which the condensed gasoline and the uncondensed vapors are received. The condensed gasoline is withdrawn from time to time. The uncondensed vapors, consisting largely of butane and propane, carrying also in some quantity the more readily condensible vapors, as gasoline, which should be recoverd, were, in the apparatus shown in the Letters Patent above mentioned, permitted to escape without any attempt being made to recover the gasoline. It has been found, however, that the quantity of gasoline thus carried off with the lighter vapors is such that an effort should be made to recover it. Accordingly, in accordance with the present invention, these uncondensed vapors, from which gasoline has been separated in the condenser, are returned to the absorber, as by a pipe $m'$, fitted with a suitable controlling valve $m^2$, and a pump $m^3$. The controlling valve $m^2$ is of ordinary construction and is of such a character as to permit the uncondensed vapors to be drawn off by the pump without creating a vacuum in the receptacle $m$, the condenser $l$, or the still $e$, while the pump $m^3$, also of ordinary construction, is of such a character as to deliver the uncondensed gases thus drawn off into the connection to the absorber $b$ against the pressure, comparatively slight, in the pipe $a$ and absorber. In the operation of this part of the invention the absorbent menstruum, after the operation has been carried on for some time, will become completely saturated with butane but this will not to any great extent diminish the capacity of the oil for absorbing gasoline. The gasoline so absorbed will be carried over with the menstruum or oil and will be separated therefrom in the still. Such of the butane as is not separated in the blow-off tank will be carried over with the menstruum and a large part of it will be separated in the separator $k$ by reason of the heating of the oil in the preheater $c^3$, $c^4$ and will be caused to bubble through the highly heated oil in the still and thereby assist, as previously described, in the separation of the gasoline from the oil in the still. The butane (and with the butane, of course, will be included other light vapors, such as propane) separated in the still will pass through the rectifier and the condenser and, remaining uncondensed, will be again returned to the absorber, carrying with it, as previously described, some of the gasoline vapors which, in large part, will be absorbed by the menstruum in the absorber.

The improvements in the method and apparatus herein described have been devised with particular relation to the practise of the method and the operation of the apparatus described and shown in the Letters Patent hereinbefore recited, but it will be understood that the present improvements are not necessarily limited to combination with the precise steps of the method and the particular apparatus described and shown in said Letters Patent and that the present improvements in the method may be practised in apparatus other than that shown and described herein.

I claim as my invention:

1. The method of recovering condensible vapors from gas which consists in causing the vapors to be absorbed by a menstruum, permitting the more readily separable vapors to be separated from the menstruum, thereafter heating the menstruum to separate the more readily condensible vapors, causing the vapors first separated to pass through the heated menstruum to facilitate the separation therefrom of the more readily condensible vapors, and withdrawing the vapors separated from the heated menstruum.

2. The method of recovering condensible vapors from gas which consists in causing the vapors to be absorbed by a menstruum, causing the charged oil to flow continuously and freely in a relatively shallow and narrow stream of such length that the oil at the outlet end can be maintained at a materially higher temperature than at the inlet end, applying heat externally to the stream of menstruum to heat the menstruum progressively as it flows, permitting the less readily condensible vapors to separate from the menstruum before it is heated substantially, causing such less readily condensible vapors to bubble through the menstruum where it is heated to a substantially high degree, and withdrawing the vapors separated from the heated menstruum.

3. The method of recovering condensible vapors from gas which consists in causing the vapors to be absorbed by a menstruum, causing the charged menstruum to flow continuously and freely in a relatively shallow and narrow stream of such length that the menstruum at the outlet end can be maintained at a materially higher temperature than at the inlet end, applying heat externally to the stream of menstruum to heat the menstruum progressively as it flows, cooling the menstruum, causing the cooled menstruum to reabsorb vapors from other gas and to be returned for further treatment in like manner, permitting the less readily condensible vapors to separate from the menstruum, causing such less readily condensible vapors to bubble through the menstruum where it is heated to a substantially high degree, and withdrawing the vapors separated from the heated menstruum.

4. The method of recovering condensible vapors from gas which consists in causing the vapors to be absorbed by a menstruum, causing the charged menstruum to flow continuously, applying heat externally to heat the menstruum progressively as it flows, cooling the menstruum, causing the cooled menstruum to reabsorb vapors from other gas and to be returned for further treatment in like manner, permitting the less readily condensible vapors to separate from the menstruum elsewhere than at the point where the menstruum is heated, causing such less readily condensible vapors to bubble through the menstruum where it is heated to a substantially high degree, and withdrawing the vapors separated from the heated menstruum.

5. The method of recovering condensible vapors from gas which consists in causing the vapors to be absorbed by a menstruum, causing the charged menstruum to flow continuously, applying heat externally to heat the menstruum progressively as it flows, cooling the menstruum, causing the cooled menstruum to be returned for further treatment in like manner, permitting the less readily condensible vapors to separate from the menstruum elsewhere than at the point where the menstruum is heated, causing such less readily condensible vapors to bubble through the menstruum where it is heated to a substantially high degree, withdrawing the vapors separated from the heated menstruum, condensing readily condensible vapors and returning the less readily condensible vapors to the cooled menstruum that such vapors may be again subjected to the menstruum for absorption.

6. In an apparatus for separating condensible vapors from a liquid menstruum without substantially changing the character of the menstruum except for the withdrawal of such vapors, the combination of a still, means to supply the menstruum thereto at one end continuously, means for heating the menstruum as it flows through the still, a separator to which the charged menstruum is admitted before it enters the still and in which the less readily condensible vapors are permitted to separate from the menstruum, a connection by which the menstruum is conducted from the separator to the still, means whereby the vapors separated in the separator are caused to pass through the menstruum in the still where the temperature of the menstruum is higher than that in the separator, and means to withdraw from the still all of the vapors released therein from the menstruum.

7. In an apparatus for separating condensible vapors from a liquid menstruum without substantially changing the character of the menstruum except for the withdrawal of such vapors, the combination of a relatively long and narrow still, means to supply the menstruum thereto at one end continuously, means to withdraw the menstruum therefrom at the other end continuously, means to heat the menstruum progressively in its passage through the still, a separator to which the charged menstruum is admitted before it enters the still and in which the less readily condensible vapors are separated from the menstruum, means whereby the vapors separated in the separator are caused to pass through the menstruum in the still where the temperature is substantially higher than the temperature in the separator, and means to withdraw the vapors together from the still.

8. In an apparatus for the recovery of gasoline from natural gas, etc., the combination of an absorber to which the gas is delivered, a still, means to cause absorbent menstruum to pass from the absorber to the still and from the still to the absorber, means to heat the menstruum in its passage through the still, a separator to which the charged menstruum is admitted before it enters the still and in which the less readily condensible vapors are separated from the menstruum, means whereby the vapors separated in the separator are caused to pass through the menstruum in the still where its temperature is relatively high, and means to withdraw the vapors from the still.

9. In an apparatus for the recovery of gasoline from natural gas, etc., the combination of an absorber to which the gas is delivered, a still, means to cause absorbent menstruum to pass from the absorber to the still and from the still to the absorber, means to heat the menstruum in its passage through the still, a separator to which the charged menstruum is admitted before it enters the still and in which the less readily condensible vapors are separated from the menstruum, means whereby the menstruum separated in the separator is caused to pass through the menstruum in the still where its temperature is relatively high, means to condense the readily condensible vapors withdrawn from the still, and means to return the less readily condensible vapors from the condenser to the absorber.

This specification signed this 15th day of October A. D., 1920.

EDMUND S. MERRIAM.